March 14, 1967     H. W. APPEL ETAL     3,308,652

ULTRASONIC TRANSDUCER SCANNER

Filed Jan. 29, 1964     3 Sheets-Sheet 1

INVENTOR.
HENRY W. APPEL
WILLY BORBERG
ARTHUR F. HAYEK

ATTORNEY.

United States Patent Office 3,308,652
Patented Mar. 14, 1967

3,308,652
ULTRASONIC TRANSDUCER SCANNER
Henry W. Appel Eastchester, Willy Borberg, Briarcliff Manor, and Arthur F. Hayek, Pleasantville, N.Y., assignors, by mesne assignments, to Smith Kline & French Laboratories, Philadelphia, Pa., a corporation of Pennsylvania
Filed Jan. 29, 1964, Ser. No. 340,997
5 Claims. (Cl. 73—71.5)

This invention relates to scanners generally and more particularly to compound scanners particularly suitable for use with ultrasonic probes for investigating the interior structure of solid objects such as the human body.

The advantages of a compound scan over a simple linear scan in ultrasonography are pointed out in great detail in Patent No. 3,023,611 to Howry. Howry discloses a rudimentary linear/circular compound scan in which the acoustic transducer is linearly scanned at a rapid rate and arcuately scanned at a much slower rate.

While this scanning technique provides a substantial improvement over a simple linear scan it does not, however, take into account the irregularities of the object being viewed. In the case of the human body the irregularities may in many instances be substantial and a compound linear/circular or arcuate scan is incapable of providing the accuracy of reproduction necessary. With a linear arcuate scan the irregularities of the object being viewed impose a severe limitation on operation due to the criticality of focus of the ultrasonic transducer.

One object of this invention is to provide scanning system for an ultrasonic probe which is capable of securing a highly accurate picture of the interior structure of solid bodies of any regular or irregular shape.

Another object of the invention is to provide an ultrasonic transducer scanning system which is capable of scanning a solid object and maintain the average transducer position a fixed distance from a predetermined reference throughout the entire scan.

A further object of the invention is to provide a compound scanner for an ultrasonic probe which provides a high rate sector scan and a slow rate contour scan while maintaining the transducer a fixed distance from a predetermined reference.

The invention contemplates a scanner for driving an ultrasonic probe used for investigating the interior of solid objects comprising, a holder for mounting the probe, means for translating the holder across the object at a uniform slow rate, means for providing a fixed displacement high speed limited scan superposed on said low speed scan and the center of which high speed scan is determined by the then attained translatory position of the holder, and means responsive to the instantaneous translatory position of the holder for providing a preprogrammed displacement of the holder in the direction of exploration of the probe whereby the sonic beam is at all times focused on the object being explored.

The foregoing and other objects and advantages of the invention will become more apparent from a consideration of the specification and drawings wherein the invention is described and shown in detail for illustrative purposes.

Figure 1:
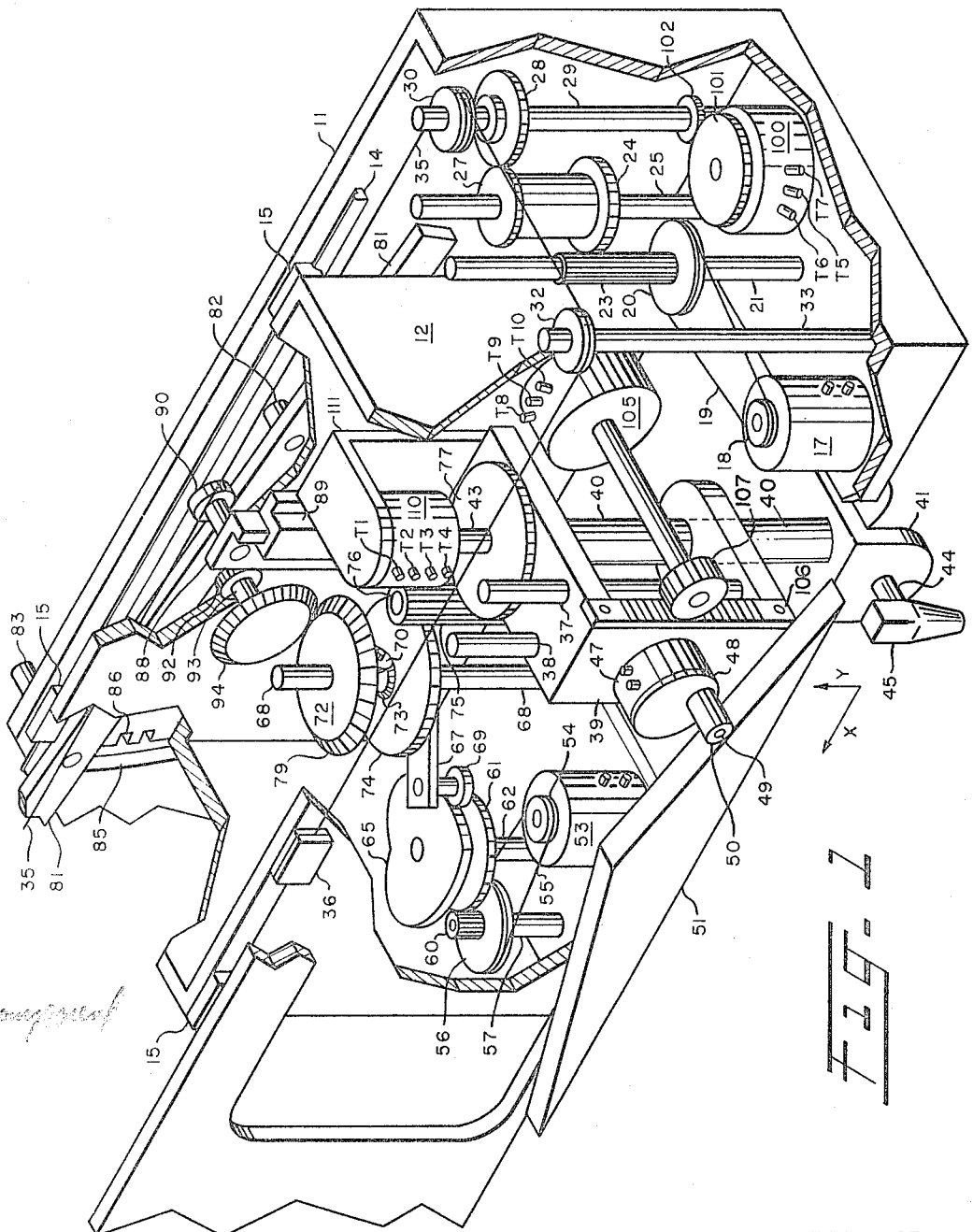
FIGURE 1 is an isometric view of a novel scanning device constructed in accordance with the invention.

In FIGURE 1 a rectangular box-like member 11 provides a support structure for the scanning system. Member 11 is supported by structure not shown which may or may not permit movement of the member in any one of three orthogonal axes.

The support structure for member 11 is not shown since it is not part of the invention and would, if shown, tend to obscure the disclosure. However, in a complete inspection device, of the type disclosed, provision must be made to vary the position of the object with respect to the ultrasonic probe by either repositioning the object or the probe whereby successive sectional compound scans may be made. Insofar as the description of the scanning device herein disclosed is concerned only a single sectional compound scan will be described. Furthermore, member 11 will be considered a fixed element since it remains fixed throughout one entire sectional compound scan.

A second box shaped member 12 fits within member 11 and is slidably supported on two rails 14, only one of which is visible, attached to opposite inwardly facing walls of member 11. Movable support 12 is suspended from rails 14 by four slide blocks 15, only three of which are visible. The blocks are attached to the outside walls of support 12 and extend for a short distance only.

A motor 17 is mounted on the base of support 11 and has a motor pulley 18 keyed to its output shaft. The rotary motion supplied by motor 17 is transmitted via a belt 19 to a second pulley 20 mounted on a countershaft 21. Shaft 21 is supported between the base of support 11 and the cover, not shown. The cover has been omitted to reveal the details of the scanner which would otherwise have been obscured.

Pulley 20 is drivingly connected to a pinion gear 23 mounted on shaft 21. This gear drives a second gear 24 mounted on a second countershaft 25 which is supported in the same manner as shaft 21. Gear 24 is drivingly connected to a second pinion gear 27 which drives a gear 28 mounted on a shaft 29 extending between the base and cover of support 11.

A wrapped pulley 30 is mounted on shaft 29 and is driven by gear 28. Three identical pulleys 32 one mounted in each corner on a shaft 33 in conjunction with wrapped pulley 30 support a drive cord 35. Cord 35 is connected to movable support 12 by a clamping block 36. Thus as motor 17 rotates movable support 12 is propelled along rails 14 at a uniform velocity. Two limit switches, not shown, mounted on the inner face of the front wall of support 11 cooperate with movable member 12 to reverse motor 17 each time support 12 reaches a limit switch and the support moves back and forth along rails 14. This feature is not part of the invention and is described solely to indicate how the novel scanner operates within a complete unit. Each time motor 17 reverses, another complete compound scan is performed and either the object or support 11 must be moved if a different section of the object is to be viewed during the next complete compound scan.

Two cylindrical struts 37 and 38 are attached to the base of movable support 12 and guide a generally U shaped member 39 which is free to move up and down struts 37 and 38. A tubular member 40 passes through openings in U shaped member 39 and the base of support 12 and supports another U shaped member 41. Tubular member 40 and U shaped member 41 form a unitary structure rigidly attached to U shaped member 39 and are free to move with member 39.

A shaft 43 is journaled in tubular member 40 and is drivingly connected by a pair of miter gears, not visible, to a shaft 44 journaled in U shaped member 41. The ultrasonic transducer or probe 45 is mounted on shaft 44 and follows the movements of shaft 44 which will be described in detail later.

A rotary solenoid 47 is attached to the vertical portion of member 39 and has a disc 48 drivingly connected to the output shaft. An eccentric pin 49 mounted on disc 48 carries a bushing 50 which engages and follows a cam 51 attached to the front wall of support 11. With this arrangement the probe 45 follows the displacement of follower bushing 50 as the movable support is propelled by motor 17 and its associated drive. Thus the vertical displacement of the probe 45 from a fixed reference is a function of its displacement by motor 17. The particular function is determined by the shape of cam 51.

Cam 51 may assume a variety of shapes depending on the nature of the object being investigated. If an eyeball is the object it may be circular or triangular as shown. If on the other hand the object is irregular, the cam may be similarly shaped and the probe 45 will be maintained the same distance from the object throughout the entire compound scan. The possible shapes which cam 51 may assume will be considered in greater detail later in connection with the description of other components with which it cooperates.

Solenoid 47 may assume any one of two positions depending on whether or not it is energized. These two possible positions permit the detection of artifact images since the position of artifact images will be affected by a change in the vertical position of probe 45 by as little as a few millimeters. In an ordinary compound scan solenoid 47 will remain deenergized and only energized to check for artifact images. This is accomplished by energizing solenoid 47 to displace probe 45 a few millimeters and observing changes in the image resulting therefrom on the viewing device employed with the scanner.

Probe 45 moves in a direction labeled X in FIGURE 1 under the control of motor 17 and in the Y direction under the control of cam 51. In addition it oscillates about the axis of shaft 44 with a period which is much smaller than the X direction period and makes many sector scans in one trip across the device in the X direction. The probe must at the center of successive sector scans point at the same areas of the object being viewed and therefore must be turned at an ever increasing angle on either side of the center of the X direction scan, that is if we assume a symmetrically placed object. Two independent movements are combined and applied to shaft 44 to achieve the oscillatory sector scan and the proper angular displacement of the probe as a function of its X axis position or displacement.

The oscillatory movement is powered by a motor 53 secured to the base of movable support 12. A motor pulley 54 transmits the output of motor 53 via a belt 55 to a drive pulley 56 which is mounted for rotation on a shaft 57 supported by the base of support 12.

Pulley 56 drives a pinion gear 60 which meshes with a drive gear 61 mounted for rotation on a shaft 62 supported on the base of movable support 12. Gear 61 drives a heart-shaped cam 65 at a constant speed determined by the speed of rotation of motor 53 and the ratios of the two interconnecting drives.

An arm 67 is pivotally supported by a shaft 68 and a cam follower 69 mounted on the end of arm 67 is urged, by spring means not shown, into engagement with heart-shaped cam 65. Thus, as the cam 65 rotates, follower 69 and arm 67 impart an oscillating motion to shaft 68.

Shaft 68 is keyed to the planet gear assembly 70 of a differential 72 and the oscillatory motion is applied to the probe 45 through the lower sun gear 73 of differential 72, the lower end spur gear 74, a splined pinion gear 75 mounted on a shaft 76 and a drive gear 77 keyed to shaft 43 which is connected to probe 45 as previously described. Only part of the planet gear assembly 70 is visible, however, it is conventional in all respects, and lower sun gear 73 is integral with lower end spur gear 74. The upper sun gear of differential 72 is not visible, however, it is integral with an upper end bevel gear 79 and is driven thereby.

A bar 81 is pivotally supported at its center on the rear wall of support 11 by a stud 82 attached to the walls and a spring handle 83 passes through an arcuate opening 85 in the wall. The inner portion of the opening 85 is provided with a series of notches 86 within which spring handle 83 rests to lock bar 81 once it is properly adjusted. Bar 81 may be readily readjusted by urging spring handle 83 to the left, as seen in the drawing, and raising or lowering the bar as desired thusly inclinable, it can serve a camming function as will subsequently be described. Once the desired position is attained, spring handle 83 can be released and it will enter the nearest notch 86 thus preventing further movement of the bar.

A rack gear 88 is slidably arranged in a guide 89 attached to the inside of the rear wall of support 12 and is free to move up and down with respect thereto. Rack gear 88 is provided with cam follower 90 which engages the top surface of bar 81. Thus, if bar 81 is at a position other than horizontal, the rack 88 will be displaced vertically within the guide 89. The amount of vertical displacement is a sole function of the angular position of bar 81 with respect to rails 14. The greater the angle the greater the displacement. When the bar 81 is parallel to rails 14 no displacement is provided.

Rack 88 drives a gear 92 mounted on a shaft 93 and through shaft 93 a bevel gear 94 which mates with and drives upper end of bevel gear 79. With this arrangement the displacement provided by the linear position of cam follower 90 is added to or subtracted from the oscillatory angular displacement provided via heart-shaped cam 65 and the interconnecting drives therefrom to probe 45.

For proper alignment probe 45 must be initially mounted such that it is normal to the movable support 12 when the cam follower 90 is coincident with the pivot provided by stud 82. If this alignment procedure is followed the probe 45 will rotate from a point on one side of its normal position, through the normal position and to a point on the other side of the normal position as support 12 moves along rails 14 from one side of support 11 to the other. The amount of angular displacement on either side depending on the angle the bar 81 makes with rails 14.

Figure 3:
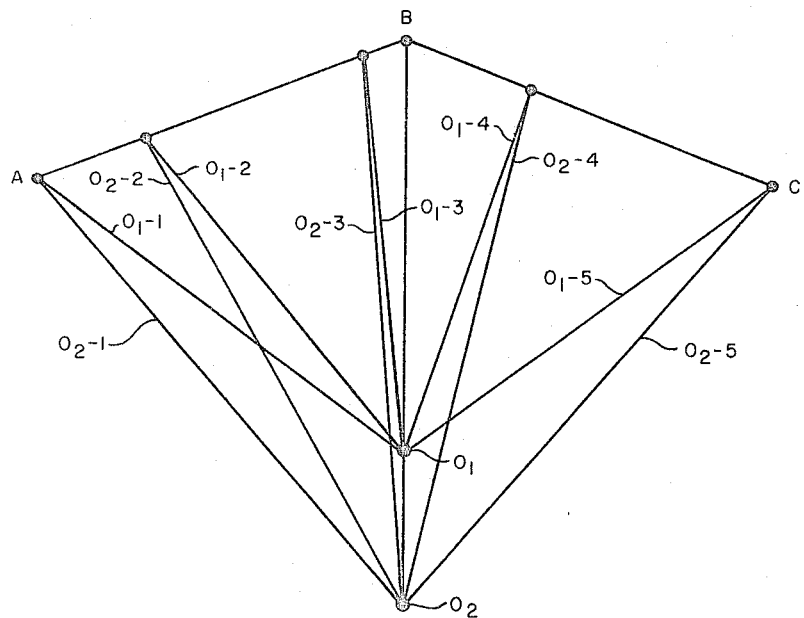
FIGURE 3 is a schematic graphical representation of the path of the ultrasonic waves under two different operating conditions.

This feature is graphically illustrated in FIGURE 3 where the lines $O_{1-1}$ through $O_{1-5}$ indicate the angular position of the probe 45 as it moves in the X direction from left to right with one fixed setting of the bar 81; and lines $O_{2-1}$ through $O_{2-5}$ indicate the angular position of probe 45 as it moves in the X direction from left to right for a lesser angular position of bar 81.

FIGURE 3 illustrates how bar 81 permits the use of different focal length probes for examining a wide variety of objects. In addition, the use of a triangular shaped cam such as that illustrated provides a useful approximation of a circular path for different focal length probes since the $O_1$ series of radials are all within the depth of field of the available probes for viewing $O_1$, while the $O_2$ series of radials are all within the depth of field of the probe available for viewing $O_2$. In FIGURE 3 the probe moves along the triangular cam line (A, B, C) and oscillates symmetrically about the radials illustrated. When an irregular object is to be examined, a cam corresponding in contour thereto is substituted for triangular cam 51 to assure proper displacement of the probe. It should be noted, however, that the surface shape of the object may not coincide with the desired line of exploration and the proper selection of the cam shape will reside with the operator.

The output of probe 45 is customarily used to modulate the electron beam in a cathode ray tube. Therefore the exact position of the probe must be known in order that the beam modulation be meaningful and present an accurate picture. The X and Y coordinates of the probe must be known as well as its instantaneous angular position. These values are employed to control the scanning of the electron beam of the cathode ray tube so that the modulation of the beam by the output of the probe will physically correspond to the actual object being investigated.

The X coordinate is supplied by a potentiometer 100 driven by a pair of gears 101 and 102 and shaft 29. The Y coordinate is supplied by a potentiometer 105 driven by a rack 106 attached to member 39 and a gear 107 meshing therewith. The instantaneous angular position of probe 45 is provided by a resolver 110 supported on a bracket 111 and connected to shaft 43 for rotation. The electrical connection of these transducers and how they control the scanning of the electron beam in the cathode ray tube is shown in FIGURE 2.

Figure 2:
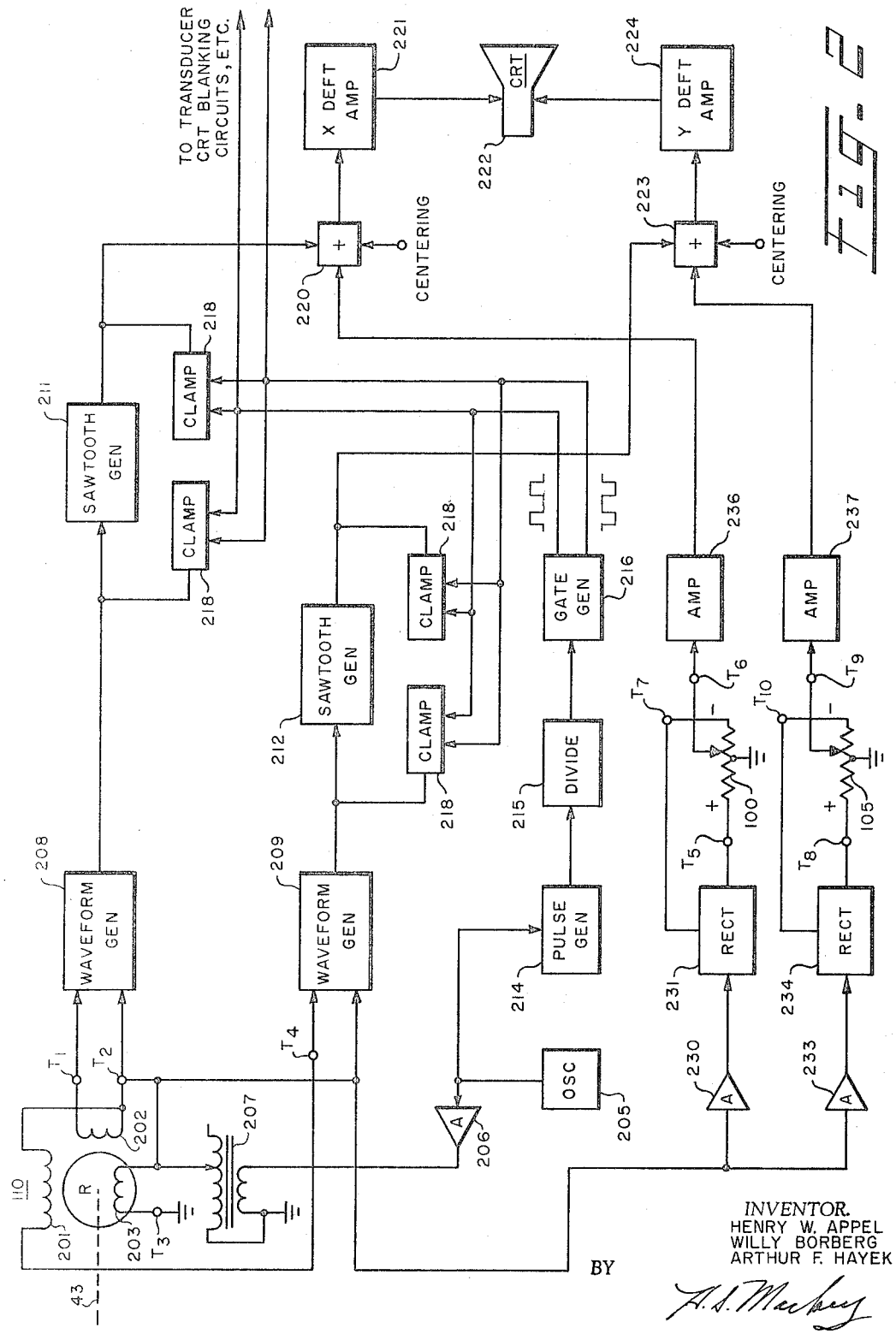
FIGURE 2 is a schematic block diagram for illustrating one mode of utilizing the novel scanner shown in FIGURE 1.

In FIGURE 2 resolver 110 and potentiometers 100 and 105 are reproduced in electrical schematic format and their interconnections with the remainder of the circuit are shown via their terminals which use similar reference numerals in both figures.

Resolver 110 is conventional in all respects and includes two stator windings 201 and 202 at right angles to each other and a rotor winding 203 driven by shaft 43, previously described. An oscillator 205 energizes rotor winding 203 through an amplifier 206 and the tapped secondary of a transformer 207.

Terminal $T_2$ is common to windings 201, 202 and 203 and provides the voltage appearing at the tapped secondary of transformer 207. Terminal $T_3$ connects the other side of winding 203 to ground to complete the rotor winding circuit. Terminals $T_1$ and $T_2$ are connected to a first waveform generator 208 while terminals $T_2$ and $T_4$ are connected to second waveform generator 209. Generators 208 and 209 are identical and may be constructed as shown in application Ser. No. 246,621, filed Dec. 21, 1962, by Henry W. Appel et al. and now Patent No. 3,159,794. The output of waveform generator 208 is a direct current voltage proportional to the sine of the rotor angle while the output of waveform generator 209 is a direct current voltage proportional to the cosine of the rotor angle. The outputs of generators 208 and 209 are applied to linear sawtooth generators 211 and 212, respectively. Each sawtooth generator supplies a linear sawtooth output voltage having a slope determined solely by the direct current control voltage supplied by the waveform generators to which it is connected.

A pulse generator 214, a frequency dividing network 215, and a push-pull gate generator 216 are serially connected to oscillator 205 and provide control signals to four clamping circuits 218 which time the outputs of generators 211 and 212 as well as the probe and the blanking circuits of the cathode ray tube used for displaying the probe output. The electrical circuit thus far described is identical in all respects to that disclosed in application Ser. No. 246,621 referred to above.

The output of generator 211 is applied through an adding circuit 220 and a deflection amplifier 221 to the X deflection elements of the cathode ray tube 222. The output of generator 212 is applied through an adding circuit 223 and a deflection amplifier 224 to the Y deflection elements of tube 222. These deflection voltages recreate the sector portion of the scan, however, the origin of the sector varies in both the X and Y directions as indicated in FIGURE 1 as the transducer 45 is propelled along rails 14 and raised or lowered by cam 51.

Potentiometers 100 and 105 provide direct current voltages for indicating the positional origin of the sector scan which voltages are added to the X and Y components supplied by generators 211 and 212 in adding circuits 220 and 223 respectively. Potentiometers 100 and 105 are each connected to a source of direct current voltage. The sources are derived from the alternating common source at the tap on the secondary of transformer 207. Thus, source fluctuations will not affect the linearity of the picture reproduced on cathode ray tube 222. However, fluctuations will, if they occur, affect the image size. This can be tolerated while changes in linearity cannot since they introduce distortion of the image.

The direct current source for potentiometer 100 includes an emitter follower amplifier 230 connected to the secondary of transformer 207 and a rectifier 231 connected to amplifier 230. Amplifier 230 is used to match the impedance of the secondary of transformer 207 to the input impedance of rectifier 231. Rectifier 231 may be half wave or full, however, a full wave rectifier is preferred. The output of rectifier 231 is applied to terminals $T^5$ and $T^7$ of potentiometer 100 which has a center tap grounded to the case. Thus, the output at terminal $T_6$, which is internally connected to the slide wire controlled by gear 101 and its connected drive, is a direct current voltage which may vary above and below ground reference potential depending on the angular position of the slide wire as determined by gear 101.

Potentiometer 105 is similarly energized. An emitter follower amplifier 233 is connected to the secondary of transformer 207 and has its output connected to a rectifier 234. Terminals $T_8$ and $T_{10}$ are connected to the rectifier and the voltage appearing at terminal $T_9$ is a direct current voltage which may vary above and below ground reference potential depending on the angular position of the slide wire of potentiometer 105 as determined by gear 107.

The voltage appearing at terminal $T_6$ is amplified in an amplifier 236 and applied to deflection amplifier 221 through adding circuit 220 where it is added to the X component of the sector scan deflection voltage. The voltage appearing at terminal $T_9$ is amplified in an amplifier 237 and applied to deflection amplifier 224 through adding circuit 223 where it is added to the Y component of the sector scan deflection voltages. With this arrangement the electron beam will scan the picture tube in synchronism with the scanning of the object by the transducer 45. The output of the transducer is applied to the control grid of the picture tube to modulate the beam in accordance with the return from the object and succeeding images will be superimposed to provide an extremely accurate reproduction of the object being viewed.

While one embodiment only of this invention has been illustrated and described in detail, it is to be expressly understood that the invention is not to be limited thereto. Various changes may also be made in the design and arrangement of the parts without departing from the spirit and scope of the invention as the same will now be understood by those skilled in the art.

What is claimed is:

1. A scanning device for examination of the interior of a solid object by driving an ultrasonic probe comprising:
   a first support,
   a second support mounted on and horizontally movable with respect to said first support;
   a holder slidably attached to said second support and free to move in a direction orthogonal to the horizontal motion of said support,
   a freely rotatable mount for said ultrasonic probe arranged on the lower end of said holder;
   first motive means for moving said second support in the horizontal direction such that the holder remains normal to the object being scanned,
   a cam follower rotably mounted on said second support,
   first camming means fixed with respect to said first support and coacting with said follower for controlling the position of the holder in said orthogonal direction as a first function of the displacement of the second support along said horizontal direction;
   second motive means for providing an oscillatory mechanical movement to said rotatable mount,
   second camming means fixed with respect to said first support, and,
   means mounted on said second support coacting with said second cam means for combining said horizontal and oscillatory movements, and applying the combined movement to control the angular position of the said rotatable mount, whereby the rotatable mount oscillates about a mid-point determined by the instantaneous position of the second support along its horizontal direction, thereby enabling the mid-point of said oscillatory movement to continuously point toward the center of the object being scanned.

2. A scanning device as set forth in claim 1, in which said first function is determined solely by the shape of the object being viewed and corresponds thereto.

3. A scanning device as set forth in claim 1 in which said second function is a linear function the slope of which is determined solely by the focal length of the ultrasonic probe to be used.

4. A scanning device as set forth in claim 1 in which said second means responsive to the mechanical displacement and the oscillatory mechanical motion for combining said movements and applying the combined movements to control the angular position of the mount is a mechanical differential having two of its inputs connected to the mechanical displacements and the oscillatory mechanical motion, respectively, and its output connected to the mount.

5. A scanning device as set forth in claim 1 in which, said first function is determined solely by the shape of the object to be viewed and corresponds thereto, said second function is a linear function having a slope determined solely by the focal length of the ultrasonic probe used to view the object, and said second means responsive to the mechanical displacement and the oscillatory mechanical motion for combining the movements and applying the combined movements to control the angular movements to control the angular position of the mount is a mechanical differential having two inputs responsive to the mechanical displacement and the oscillatory mechanical motion, respectively, and an output for controlling the angular position of the mount.

References Cited by the Examiner
UNITED STATES PATENTS

| | | | |
|---|---|---|---|
| 3,023,611 | 3/1962 | Howry | 73—67 |
| 3,086,390 | 4/1963 | Brown | 73—67 |
| 3,247,709 | 4/1966 | Gordon | 73—67 |

RICHARD C. QUEISSER, *Primary Examiner.*

J. J. GILL, J. P. BEAUCHAMP, *Assistant Examiners.*